United States Patent [19]

Bouchand et al.

[11] Patent Number: 4,775,576
[45] Date of Patent: Oct. 4, 1988

[54] PERPENDICULAR ANISOTROPIC MAGNETIC RECORDING

[75] Inventors: Jean-Claude Bouchand, Beynes; Jacques Desserre, Rambouillet; Dominque Jeanniot, Nanterre, all of France

[73] Assignee: Bull S.A., Paris, France

[21] Appl. No.: 885,089

[22] Filed: Jul. 14, 1986

[30] Foreign Application Priority Data

Jul. 15, 1985 [FR] France ............... 85 10791

[51] Int. Cl.$^4$ ................ H01F 10/06; H01F 10/26
[52] U.S. Cl. ................ 428/216; 428/469; 428/694; 428/702; 428/900
[58] Field of Search ........... 428/469, 611, 702, 678, 428/694, 928, 900, 216; 427/131

[56] References Cited

U.S. PATENT DOCUMENTS

| | | | |
|---|---|---|---|
| 3,350,180 | 10/1967 | Croll | 428/928 |
| 3,375,091 | 3/1968 | Feldtkeller | 428/635 |
| 3,460,968 | 8/1969 | Bate et al. | 428/928 |
| 3,479,156 | 11/1969 | Ginder | 428/635 |
| 3,516,076 | 6/1970 | Stein | 428/656 |
| 3,549,428 | 12/1970 | Lommel | 428/611 |
| 3,829,372 | 8/1974 | Heller | 428/678 |
| 4,268,369 | 5/1981 | Barlow | 427/131 |
| 4,307,156 | 12/1981 | Yanagisawa | 428/694 |
| 4,385,098 | 5/1983 | Sugita et al. | 428/629 |
| 4,396,575 | 8/1983 | Absaf et al. | 428/606 |
| 4,540,600 | 9/1985 | Kobayashi et al. | 427/131 |
| 4,555,444 | 11/1985 | Hanaoka | 427/131 |
| 4,578,322 | 3/1986 | Sawamura et al. | 428/694 |
| 4,667,032 | 6/1987 | Robinson | 428/611 |

FOREIGN PATENT DOCUMENTS 83218 5/1985 Japan .

Primary Examiner—George F. Lesmes
Assistant Examiner—William M. Atkinson
Attorney, Agent, or Firm—Kerkam, Stowell, Kondracki & Clarke

[57] ABSTRACT

A substrate for perpendicular anisotropic magnetic recording comprises a nonmagnetic substrate (SUBSI) on which a thin metal magnetic medium (CMI) having a negative magnetostrictive effect is deposited. The direction of easy magnetization of the medium is perpendicular to the surface. In order to minimize the magnetostrictive effect in the metal magnetic medium, the medium comprises a stack of alternate thin magnetic and nonmagnetic layers ($CI_1$-$CI_n$, $ISO_1$-$ISO_{n-1}$), the nonmagnetic layers ($ISO_1$-$ISO_{n-1}$) being sufficiently flexible so as to dampen the effect of the strains in the magnetic layers and enable strong magnetic coupling between them. The thickness of the nonmagnetic layers is between 150 and 250 angstroms, while the thickness of the magnetic layers is between 700 and 2000 angstroms. The stack may include as many as 10 or more magnetic layers of a chrome/cobalt alloy. The nonmagnetic layers may be SiO, $SiO_2$ and mixtures thereof. The invention is applicable to magnetic recording disks.

12 Claims, 3 Drawing Sheets

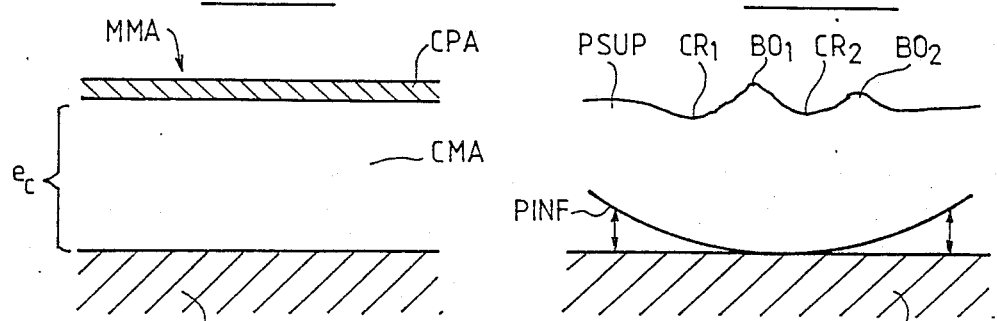
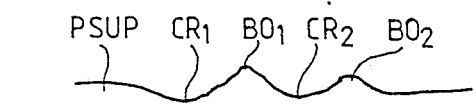
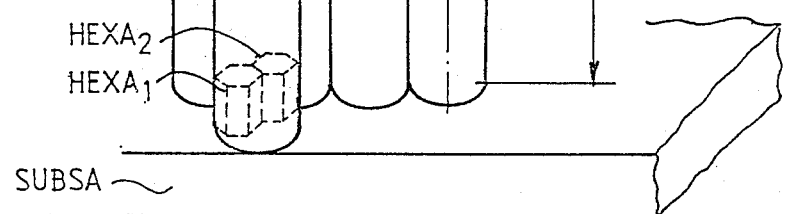
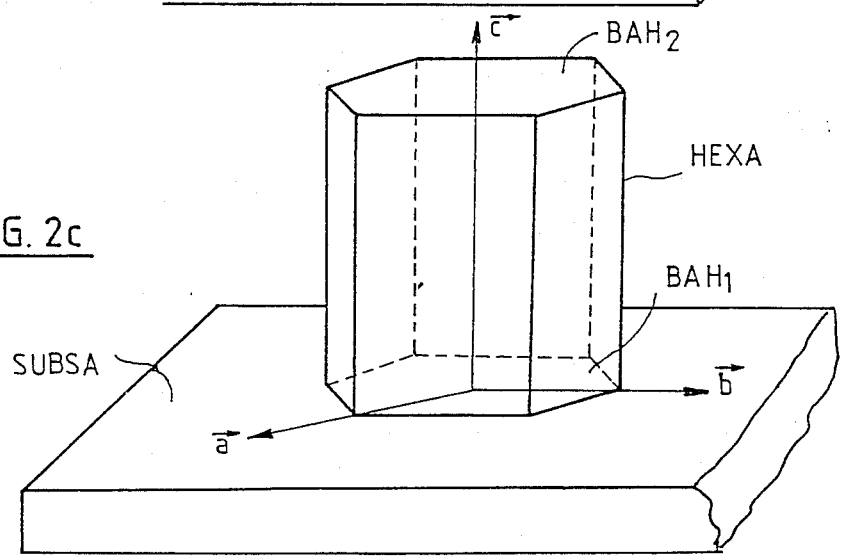
FIG. 2a
FIG. 2d
FIG. 2b
FIG. 2c

PERPENDICULAR ANISOTROPIC MAGNETIC RECORDING

FIELD OF THE INVENTION

The present invention relates to a recording medium for perpendicular anisotropic magnetic recording. More particularly, it is applicable to high linear and radial density perpendicular recording on magnetic disks of disk memories.

BACKGROUND OF THE INVENTION

It is known that data recorded on magnetic disks are contained inside concentric circular tracks and take the form of a succession of small magnetic cells, known as elementary cells, distributed over the entire length of each track.

In recording on magnetic disks, the present trend is to seek to obtain radial densities of several thousand tracks per centimeter (measured radially) and linear densities that are equal to or greater than ten thousand changes of the direction of magnetization per centimeter (measured along the circumference of the tracks).

A preferred mode of writing data that makes it possible to obtain such recording densities is known as perpendicular recording, where the magnetization in the elementary cells is perpendicular to the magnetic recording layer of the disk. In this mode, the magnetic medium comprising the layer is an anisotropic magnetic medium, having a preferred direction of magnetization, hence known as the direction of easy magnetization, perpendicular to the recording layer.

Generally, the disk (or recording substrate) thus comprises a nonmagnetic substrate on which the magnetic medium for perpendicular recording is deposited, the thickness of this medium being very small, on the order of a micron. On this magnetic medium, a nonmagnetic protective layer is typically deposited, so as to assure mechanical protection for this medium and to prevent corrosion or oxidation.

The magnetic medium for perpendicular recording typically comprises an alloy including at least two simple elements, such as chrome and cobalt, iron and terbium, terbium and gadolinium, etc.

The minimum quality required for perpendicular recording media has to do with the coercive field and the rectangularity of the representative hysteresis curve of this medium in the direction of easy magnetization. The coercive field $H_c$ in this direction must be high enough to avoid any perturbation of the data written on the disk by parasitic magnetic fields. At the same time, the coercive field must not be too high, so that it will be possible to write data by reversing the direction of magnetization in the adjacent elementary cells by means of the magnetic writing field. This field is generated by a magnetic writing transducer associated wth the magnetic disk. Under the conditions defined above, the coercive field has a value that in practice is on the order of a few hundred oersteds. It should also be noted that for high-density data, the reading signal generated by the magnetic transducers for reading these data is proportional to the coercive magnetic field $H_c$.

Furthermore, the ideal form of the hysteresis curve or cycle of a magnetic medium for perpendicular recording is a rectangle. On this subject, reference may be made to the thesis by Dominique Jeanniot submitted to the Universite Pierre et Marie Curie on Nov. 21, 1983, entitled "preparation et caracterisation de couches minces anisotropes de CoCr et de a-FeTbGd pour enregistrement magnetique perpendiculaire" ("Preparation and characterization of thin anisotropic layers of CoCr and a-FeTbGd for perpendicular magnetic recording"). In effect, the remanent magnetization thus remains elevated, being as near as possible to saturation magnetization.

Among the metal materials preferably used to make perpendicular magnetic recording media are the alloys of chrome and cobalt comprising 15 to 20% chrome and 80 to 85% cobalt. The properties of chrome/cobalt alloy (CoCr) are well known, however, because they have been the subject of many studies cited in the aforementioned thesis, particularly on pages 41, 42, 43 and 128 thereof.

Perpendicular magnetic recording media of CoCr has been obtained particularly by cathodic diode radiofrequency pulverization, performed under partial argon pressure at temperatures on the order of 250 to 300 degrees. An explanation of cathodic radiofrequency pulverization is provided in the aforementioned thesis, in Appendix I, pages 133–151.

It has been possible to confirm by experimentation that beginning at a certain thickness of the CoCr recording medium, on the order of a few thousand angstroms to 1 micron, the anisotropic magnetic properties of the chrome/cobalt alloy deteriorate: The coercive field decreases, and the hysteresis cycle is less rectangular. This deterioration of the magnetic properties of the chrome/cobalt alloy becomes still greater, the more the thickness of the magnetic medium increases. This is due to the fact that the chrome/cobalt magnetic medium is under strain due to internal mechanical stresses inside the medium which tend to deform the layer. The existence of these stresses is due for example to differences in dilation arising between the magnetic recording medium and the substrate after the magnetic medium has been deposited on the substrate. These differences in dilation arise at the moment the recording substrate, as a whole, cools. This modification of the magnetic properties of the perpendicular recording medium brought about by the strains is due to the magnetostrictive effect, which arises at the microscopic level. It will be remembered that the magnetostrictive effect means that for certain materials, the existence of mechanical strains causes a modification of the magnetic properties, and reciprocally, the application of a magnetic field to these materials engenders a mechanical strain. Since, as noted above, the anisotropic magnetic properties deteriorate, the magnetostrictive effect is known as the negative magnetostrictive effect.

OBJECT AND SUMMARY OF THE INVENTION

With the present invention, the disadvantages induced by the magnetic recording substrate according to the prior art described above can be overcome by minimizing the strains in the magnetic medium and thereby improving its magnetic properties.

In a substrate for perpendicular anisotropic magnetic recording including a nonmagnetic substrate on which a metal magnetic medium of slight thickness and having a negative magnetostrictive effect is deposited, its direction of easy magnetization being perpendicular to the surface, it is provided according to the invention that in order to minimize the magnetostrictive effect in the metal magnetic medium, the magnetic medium comprises a stack of thin magnetic and nonmagnetic layers in alternation, the nonmagnetic layers being sufficiently flexible as to dampen the effect of the strains in the magnetic layers and having a very thin overall thickness, enabling strong magnetic coupling between them.

Further characteristics and advantages of the present invention will become apparent from the ensuing description of a purely illustrative exemplary and in no way limiting embodiment, taken in conjunction with the drawings.

BRIEF DESCRIPTION OF THE DRAWINGS

FIG. 2, including FIGS. 2a–2d, is a reminder of how a recording substrate according to the prior art is embodied;

DESCRIPTION OF THE PREFERRED EMBODIMENT

Figure 1:
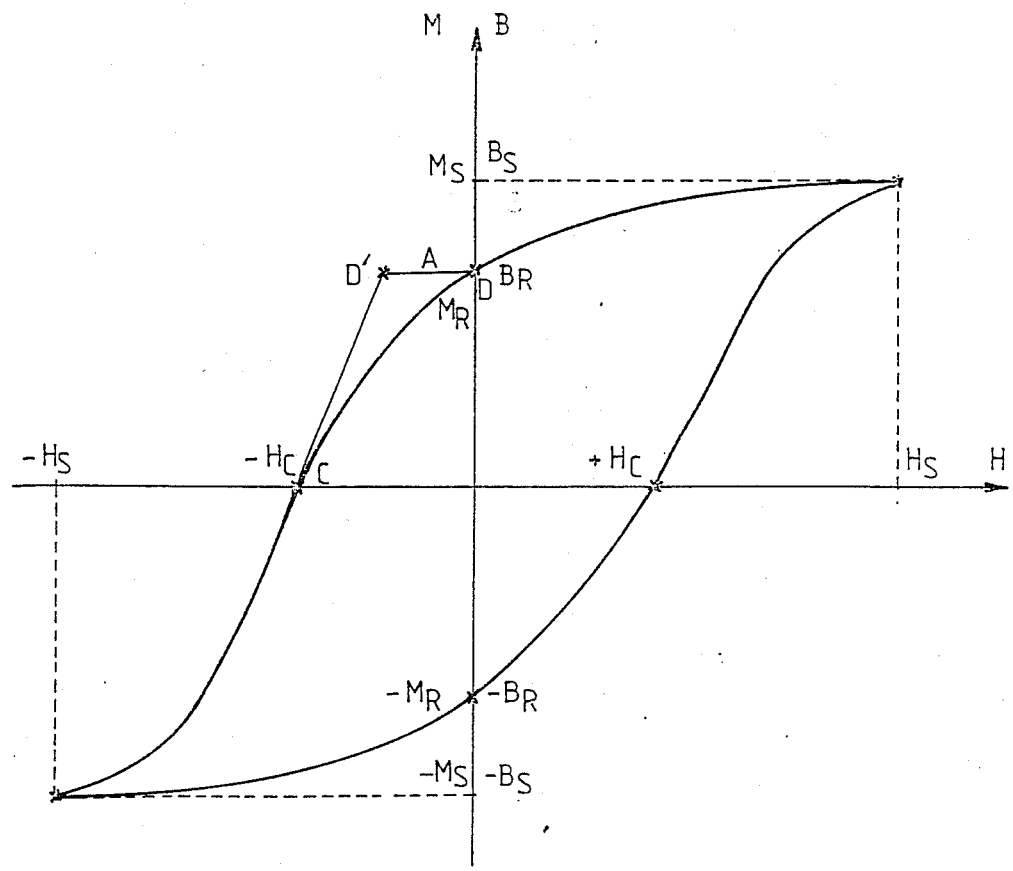
FIG. 1 illustrates a hysteresis cycle of a magnetic material, showing the evolution of magnetization (or induction) as a function of the magnetic field applied to the material, for the sake of better comprehension of the parameters that define the rectangularity of this cycle.

FIG. 1 shows the hysteresis curve or cycle M(H) or B(H) of a magnetic material, which may, for example, be a chrome/cobalt alloy which is magnetically anisotropic. This cycle is one measured in the direction of easy magnetization of this material, which is assumed to be perpendicular to its surface.

$H_s$, $M_s$ and $B_s$ stand for the magnetic field of saturation, the magnetization of saturation and the induction of saturation, respectively.

The quantities $M_r$ and $B_R$ stand for the remanent magnetization and magnetic induction, respectively.

The quantity $H_c$ stands for the coercive field.

If a tangent to the hysteresis cycle is taken at point C on the ordinate where $M-0$ and on the abscissa at $-H_c$, this tangent intersects at point D' with the parallel to the axis of the absiccas taken at point D of the abscissa where $H=0$ and on the ordinate at $+M_R$. Let $A=DD'$.

The two quantities $S=M_R/M_S$ and $S^*=A/H_c$ define the rectangularity of the cycle. For a perfectly rectangular cycle, it is thus true that $$S=S^*=1.$$

It will be understood that in the ensuing description, all the above-mentioned quantities ($H_c$, S, $S^*$, $M_R$, $M_S$, $B_R$, $B_S$, $H_S$) are relative to the magnetic properties of any magnetic material in the direction of easy magnetization.

FIG. 2, in a sectional view taken along a plane perpendicular to the surface of the recording substrate, shows a substrate MMA for perpendicular anisotropic magnetic recording according to the prior art. This recording substrate includes the following:

a substrate SUBSA, for example, embodied of glass;

a substrate magnetic recording medium, or magnetic recording layer, CMA having a thickness $e_c$ on the order of a few thousand angstroms to about one micron; and a protective layer CPA, of magnetic material.

The magnetic layer CMA is assumed to be preferably embodied of a chrome/cobalt alloy such as that defined above.

It will be seen that under the typical conditions of deosition by cathodic radiofrequency pulverization under a vacuum, the magnetic materials such as chrome/cobalt, having a slight thickness, comprise elongated "grains" having an orientation perpendicular to the layer (and to the substrate). These grains are capable of being assimilated in cylindrical columns, the axis of symmetry of which is perpendicular to the plane of the substrate. It will be seen that in order for these columns to form, their height h, measured perpendicular to the plane of the substrate SUBSA, must at a minimum be on the order of 1000 to 2000 angstroms, and that their diameter must be on the order of 100 to 3000 angstroms.

FIG. 2b shows the disposition relative to some of these columns, five of which are shown here and identified as $COL_1$, $COL_2$, $COL_3$, $COL_4$, and $COL_5$. In order to simplify the drawing, these columns are shown tangent to one another here. Their axis of symmetry perpendicular to the plane of the substrate SUBSA is represented by Ax.

The crystallographic structure of a chrome/cobalt alloy is represented in FIG. 2c. This is a polyhedron HEXA having a hexagonal base, where the atoms of cobalt and chrome are located at the apex of each of the two hexagonal bases $BAH_1$ and $BAH_2$. The axis $\bar{c}$ of the hexagonal face (the vertical axis in FIG. 2c) is practically normal to the plane of the layer and to the plane of the substrate. The axes of the various hexagonal faces and the axis Ax of the various columns are accordingly practically parallel to one another.

In FIG. 2b, only two hexagonal faces $HEXA_1$ and $HEXA_2$ have been shown, adjacent to one another and inserted in the interior of the column $COL_5$, but it will be appreciated that a very much greater number of faces in the order of a few tens or even a few hundred or more, may be contained inside a single column. This simplification makes it possible to show how the hexagonal faces are disposed inside each column. It is thus clear that each column comprises a plurality of hexagonal faces, which have an axis perpendicular to the plane of the layer and are stacked on top of one another. It will be appreciated that the actual dimensions are not shown to scale in FIG. 2b.

Thus as noted above, the magnetic layer CMA has a perpendicular magnetic anisotropy. A uniaxial energy of anisotropy $E_a$ is associated with this phenomenon, and magnetic anisotropy is found to have various origins, that is, anisotropy of magnetocrystalline origin, anisotropy of magnetostrictive origin and anisotropy of form. These three types will be explained below.

Magnetocrystalline anisotropy represents the influence of crystallographic axes such as the axis c shown in FIG. 2c. In the case of chrome/cobalt, the magnetization is preferentially aligned along the axes $\bar{c}$. An energy $E_k$ corresponds to this anisotropy.

Anisotropy of shape is due to the form of the magnetic material in question. Thus beginning with a certain thickness, columns such as the columns $COL_1$–$COL_5$ shown in FIG. 2b are responsible for the anisotropy of form of the magnetic layer CMA made of the chrome/cobalt alloy. An energy $E_d$ corresponds to this anisotropy.

As mentioned above, the internal strains in the layer CMA induce a negative magnetostrictive effect in the layer, to which an energy $E_s$ corresponds (where $E_s<0$).

Hence, $$E_a = E_k + E_d + E_s.$$

Thus beginning at a certain thickness, where the internal strains in the layer CMA become relatively great, $E_s$ increases in absolute value, while $E_a$ decreases; this diminishes the rectangularity of the cycle, or in other words decreases the ratio of S to S*, and hence diminishes the coercive field $H_c$. This is extremely disadvantageous if such magnetic recording layers are to be used for writing or reading data at very high density.

The existence of internal strains in the layer has other disadvantages as well, more particularly those illustrated by FIG. 2d. It will be seen that the lower portion PINF of the magnetic medium CMA which is in contact with the surface of the substrate SUBSA can become detached from it. If there is strong adhesion between the substrate and the medium MMA, part of the substrate may even be torn off, at some time after the magnetic layer CMA is deposited onto this substrate. Furthermore, the condition of the surface of the upper portion PSUP of the layer CMA deteriorates when the thickness $e_c$ of the layer CMA increases. This upper portion PSUP thus comes to have a succession of depressions $CR_1$, $CR_2$ and protrusions $BO_1$, $BO_2$ (these depressions and protrusions are naturally observable only on a microscopic scale), which can impede the operations of reading and writing on the part of the magnetic reading or writing transducers.

Figure 4:
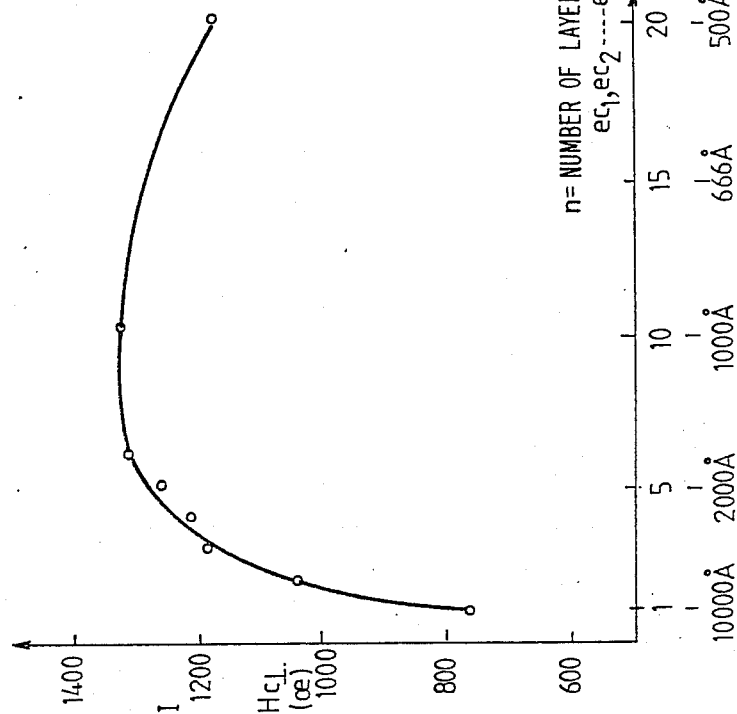
FIG. 4 is a curve showing the evolution of the coercive field of the magnetic medium, which is part of the substrate according to the invention, as a function of the number of layers.
Figure 3:
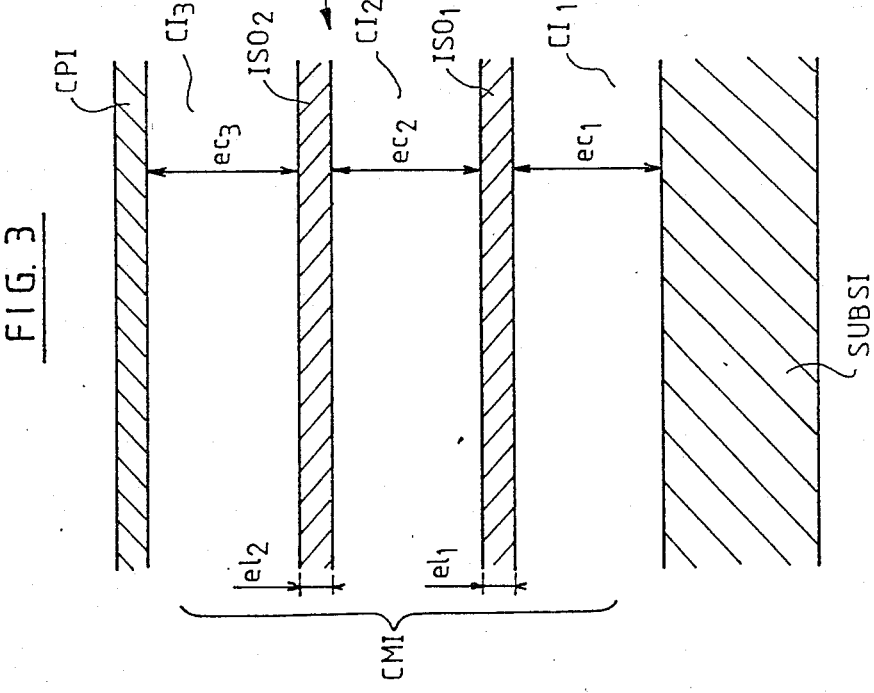
FIG. 3 is a sectional view, taken in a plane normal to the plane of the recording substrate, showing a recording substrate according to the invention.

The magnetic substrate MMI according to the invention as shown in FIG. 3 overcomes the above disadvantages and enables very substantial improvement in the magnetic properties thereof as compared to the magnetic substrate according to the prior art, as will be demonstrated soon, in conjunction with FIG. 4.

The substrate MMI according to the invention comprises a stack of alternating magnetic and nonmagnetic layers, disposed on the substrate SUBSI. The magnetic layers are labeled $CI_1$, $CI_2$, ..., $CI_n$, respectively, the variable "n" representing the number of magnetic layers in a given embodiment. In FIG. 3 the number n has been selected to be equal to three. The nonmagnetic layers are labeled $ISO_1$, $ISO_2$, ..., $ISO_{n-1}$, respectively. Each nonmagnetic layer is disposed between two magnetic layers. Thus the insulating layer $ISO_1$ is disposed between the two magnetic layers $CI_1$ and $CI_2$ and the insulating layer $ISO_2$ is disposed between the magnetic layers $CI_2$ and $CI_3$.

The symbol CMI designates the multi-layer stack comprising all the magnetic layers $CI_1$-$CI_n$ and all the nonmagnetic layers $IOS_1$-$ISO_{n-1}$. This stack is covered by a protective layer CPI, made of silicon dioxide $SiO_2$ or silicon monoxide or some mixture of these two oxides, for example. The substrate SUBSI is for example identical to the substrate SUBSA shown in FIG. 2.

Preferably the magnetic layers comprise chrome/cobalt CrCo or any magnetic metal material having a negative magnetostrictive effect, and the nonmagnetic layers comprise the same material as the protective layer CPI, but they may also be made of alumina, $Al_2O_3$.

The magnetic substrate MMI according to the invention must meet the following criteria:

1. The magnetic layers $CI_1$-$CI_n$ must retain the hexagonal crystalline structure;

2. The magnetic material must be formed in columns having their axis of symmetry perpendicular to the substrate, as is shown in FIG. 2b; and 3. The properties of magnetic anisotropy in a direction normal to the plane of the substrate must be greater than those of the magnetic medium according to the prior art.

These various criteria are met by optimizing the thicknesses $ec_1$-$ec_n$ of the magnetic layers and thicknesses $ei_1$-$ei_{n-1}$ of the insulating layers.

Preferably, $ec_1 = ec_2 = \ldots = ec_n = e_c$ on the one hand, and $ei_1 = \ldots ei_{n-1} = ei$. The thickness ei of the nonmagnetic layers is very small, on the order of 200 angstroms on the average (that is, between 150 and 250 angstroms in practice), such that these layers are sufficiently elastic and flexible to be able to follow the movements imposed by the strains in the interior of the magnetic layers $CI_1$-$CI_n$ and to improve the condition of their surface by preventing it from becoming deformed. Thus the presence of the set of nonmagnetic layers made of silicon monoxide SiO, $SiO_2$ or a mixture of the two enables attenuating the strains inside the magnetic chrome/cobalt layers.

Furthermore, the thickness of the nonmagnetic layers mentioned above is such that it enables strong magnetic coupling among the various magnetic chrome/cobalt layers.

The thickness $e_c$ of each of the magnetic layers must be between a minimum value (on the order of 1000–2000 angstroms), so that columns such as those shown in FIG. 2b can form, and a maximum value (on the order of a micron), beyond which the columns will become deformed. In either of the two cases (that is, a minimum value, or a maximum value), their axis of symmetry is no longer perpendicular to the substrate, which causes deterioration in the magnetic anisotropic properties of the recording medium (that is, attenuation of the coercive field and a lessening of the rectangularity of the cycle).

Thus FIG. 3 shows, the first layer which is deposited on the substrate SUBSI is a magnetic layer made of chrome/cobalt, but clearly it is equally possible first to deposit on the substrate SUBSI a flexible underlayer of either silicon monoxide SiO or silicon dioxide $SiO_2$ or a mixture of the two, or a magnetically permeable underlayer, for example of permalloy Ni-Fe, as mentioned in French Patent No. 2 428 886, filed on June 13, 1978 by the Compagnie Internationale pour l'Informatique Cii Honeywell Bull and entitled "Support d'informations magnetique a enregistrement perpendiculaire" ["Magnetic Data Substrate for Perpendicular Recording"].

Preferably, the total thickness $(ec_1 + ec_2 + \ldots + ec_n)$ of the various magnetic layers is on the order of a micron.

However, FIG. 4 will now be considered, which shows the evolution of the coercive field $H_c$, measured in oersteds, along the axis of easy magnetization of the layer CMI (which is perpendicular to the plane of the substrate SUBSI and its various layers $CI_1$-$CI_n$), as a function of the number n of magnetic layers $CI_n$ where $n \times ec = \text{constant} = 1$ micron. Let it also be assumed that the thickness of each of the insulating layers $ISO_1 \ldots ISO_{n-1}$ remains constant, on the order of 200 angstroms, such that the magnetic coupling between adjacent layers remains substantially constant no matter what the number on of layers. Likewise, the thickness of the substrate SUBSI remains constant, whatever the number n may be.

It is clear that the curve shown in FIG. 4 also represents the evolution of the coercive field as a function of the thickness ec of the layers, which is decreasing.

It is seen that the coercive field increases as a function of the number n of magnetic layers (it is thus increasingly large, the more the thickness of the layers decreases), until the number of layers n is equal to 10. The coercive field then decreases when the number of layers becomes greater than 15 (their thickness then becoming less than 700 angstroms).

The evolution that takes place is seen to be analogous to the coefficients S and S* which define the rectangularity of the cycle of hysteresis (in the direction of easy magnetization) of the layer CMI as a function of the number n of layers. Thus if the coefficient S is on the order of 0.09 with n=1 (a monolayer analogous to the layer CMA of the prior art), then this coefficient is on the order of 0.20 if n is between 5 and 15. Similarly, this coefficient S decreases when the number of layers becomes greater than 15.

Thus it will be appreciated that the best results (the maximum value of the coercive field Hc and the maximum value of S) are obtained for a number of layers included between 5 and 15 and for a thickness of the layers that it included between 700 and 2000 angstroms. This may be explained by the fact that for these thicknesses, the columns of the type of columns $COL_1$-$COL_5$ are perfectly formed and have their axis perfectly perpendicular to the substrate SUBSI. Furthermore, for these same thicknesses, the hexagonal crystalline structure having an axis $\overline{c}$ perpendicular to the plane of the substrate is retained.

The existence of flexible and elastic nonmagnetic thin layers of the type of the layers $ISO_1$-$ISO_2$ shown in FIG. 3, has further advantages as well, the first being the fact that the lower portion of the layer CMI which is in contact with the substrate will no longer detach from it, because of the lessening of the internal strains in the layer, and another being that the condition of the surface of the upper portion of the layer CMI (which is in contact with the protective layer CPI) is correct and better than that of the layers CMA of the prior art (see FIG. 2d).

Another advantage of the invention is that it enables the deposition of magnetic and nonmagnetic layers on the substrate SUBSI by cathodic radiofrequency pulverization in a vacuum, with deposition temperatures much less than those for recording media relating to the recording substrate of the prior art.

What is claimed is:

1. A recording medium for perpendicular anisotropic magnetic recording comprising a nonmagnetic substrate (SUBS I), a metal magnetic medium (CMI) thereon characterized by a negative magnetostrictive effect and a direction of easy magnetization perpendicular to the surface, said metal magnetic medium comprising a stack of alternate thin magnetic and nonmagnetic layers ($CI_1$-$CI_n$, $ISO_1$-$ISO_{n-1}$), for minimizing the magnetostrictive effect in the metal magnetic medium, the nonmagnetic layers ($ISO_1$-$ISO_{n-1}$) being sufficiently flexible so as to dampen the effect of the strains in the magnetic layers and enabling strong magnetic coupling between them, and wherein the thickness of the nonmagnetic layers is on the order of 200 angstroms; and wherein the nonmagnetic layers are selected from the group consisting of silicon monoxide (SiO), silicon dioxide ($SiO_2$) and mixtures thereof.

2. A recording medium according to claim 1, wherein the magnetic layers are embodied of a chrome and cobalt alloy.

3. A recording medium according to claim 1, wherein the number of magnetic layers, n, is between 1 and 15.

4. A recording medium according to claim 1, wherein the thickness of the magnetic layers is included between 700 and 2000 angstroms.

5. A recording medium for perpendicular anisotropic magnetic recording comprising a nonmagnetic substrate (SUBS I), a metal magnetic medium (CMI) thereon characterized by a negative magnetostrictive effect and a direction of easy magnetization perpendicular to the surface, said metal magnetic medium comprising a stack of alternate thin magnetic and nonmagnetic layers ($CI_1$-$CI_n$, $ISO_1$-$ISO_{n-1}$), for minimizing the magnetostrictive effect in the metal magnetic medium, the nonmagnetic layers ($ISO_1$-$ISO_{n-1}$) being sufficiently flexible so as to dampen the effect of the strains in the magnetic layers and enabling strong magnetic coupling between them, and wherein the thickness of the nonmagnetic layers is in a range between 150 and 200 angstroms; and wherein the nonmagnetic layers are selected from the group consisting of silicon monoxide (SiO), silicon dioxide ($SiO_2$) and mixtures thereof.

6. A recording medium according to claim 5, wherein the thickness of the magnetic layers is included between 700 and 2000 angstroms.

7. A recording medium according to claim 6, wherein the magnetic layers are embodied of a chrome and cobalt alloy.

8. A recording medium according to claim 5 wherein the magnetic layers are embodied of a chrome and cobalt alloy.

9. A recording medium according to claim 5 wherein the number of magnetic layers, n, is between 1 and 15.

10. A recording medium according to claim 9, wherein the magnetic layers are embodied of a chrome and cobalt alloy.

11. A recording medium according to claim 9, wherein the thickness of the magnetic layers is between 700 and 2000 angstroms.

12. A recording medium according to claim 11, wherein the magnetic layers are embodied of a chrome and cobalt alloy.

* * * * *